(12) United States Patent
Ebner et al.

(10) Patent No.: US 12,203,876 B2
(45) Date of Patent: Jan. 21, 2025

(54) INDUSTRIAL X-RAY WORKPIECE MEASURING SYSTEM AND METHOD FOR OPERATING SAME

(71) Applicant: Intom GmbH, Stockach (DE)

(72) Inventors: Severin Ebner, Bermatingen (DE); Martin Simon, Bodman-Ludwigshafen (DE)

(73) Assignee: Intom GmbH, Stockach (DE)

( * ) Notice: Subject to any disclaimer, the term of this patent is extended or adjusted under 35 U.S.C. 154(b) by 601 days.

(21) Appl. No.: 17/312,980

(22) PCT Filed: Nov. 19, 2019

(86) PCT No.: PCT/EP2019/081854
§ 371 (c)(1),
(2) Date: Jun. 11, 2021

(87) PCT Pub. No.: WO2020/120083
PCT Pub. Date: Jun. 18, 2020

(65) Prior Publication Data
US 2022/0050067 A1    Feb. 17, 2022

(30) Foreign Application Priority Data
Dec. 13, 2018   (DE) ............ 10 2018 132 025.6

(51) Int. Cl.
*G01N 23/046*    (2018.01)
(52) U.S. Cl.
CPC ..... *G01N 23/046* (2013.01); *G01N 2223/302* (2013.01); *G01N 2223/309* (2013.01); *G01N 2223/611* (2013.01)

(58) Field of Classification Search
CPC .......... G01N 23/046; G01N 2223/302; G01N 2223/309; G01N 2223/611
See application file for complete search history.

(56) References Cited

U.S. PATENT DOCUMENTS

2007/0195927 A1*  8/2007  Fung .................... G01N 23/043
                                                          378/58
2015/0160354 A1   6/2015  Mertens et al.
(Continued)

FOREIGN PATENT DOCUMENTS

CN     106501288 A     3/2017
DE     4101645 A1      8/1991
(Continued)

OTHER PUBLICATIONS

International search report for patent application No. PCT/EP2019/081854 dated Feb. 28, 2020.

*Primary Examiner* — David P Porta
*Assistant Examiner* — Mamadou Faye
(74) *Attorney, Agent, or Firm* — Bachman & LaPointe, P.C.

(57) ABSTRACT

The invention relates to an industrial X-ray workpiece measuring system including an X-ray source (4), which is arranged in an X-ray protective housing (2) and has an X-ray focal spot (3), a workpiece carrier which is arranged in the X-ray protective housing, for accommodating a non-medical workpiece (5) to be examined, and an X-ray detector (10a, 10b, 10c) provided on and/or in the X-ray protective housing, designed to detect an X-ray beam from the X-ray source, which X-ray beam penetrates the workpiece held on the workpiece carrier, and downstream of which X-ray detector, an electronic evaluator can be connected.

20 Claims, 7 Drawing Sheets

(56) References Cited

U.S. PATENT DOCUMENTS

2017/0276620 A1* 9/2017 Huang ................ G01N 23/046
2018/0180560 A1 6/2018 Gateshki et al.

FOREIGN PATENT DOCUMENTS

| DE | 69837090 T2 | 10/2007 |
| DE | 102006032607 A1 | 1/2008 |
| DE | 102007016370 A1 | 10/2008 |
| EP | 3223002 A1 | 9/2017 |

* cited by examiner

INDUSTRIAL X-RAY WORKPIECE MEASURING SYSTEM AND METHOD FOR OPERATING SAME

BACKGROUND OF THE INVENTION

The present invention relates to an industrial X-ray workpiece measuring system, in particular an industrial X-ray tomography system. Furthermore, the present invention relates to a method for operating a generic system of this kind.

Industrial X-ray workpiece measuring systems, in particular realized as X-ray tomography systems, are generally known from the state of the art and are used for production, material, quality or safety testing for a plurality of workpieces. Technologies of this kind are suitable in particular for detecting invisible defects of such a workpiece like those that can occur in an (otherwise optically inaccessible) interior of the workpiece and are visible on the X-ray image obtained by radiographing the workpiece using the X-rays.

Generically, workpiece measuring systems of this kind have workpiece support means which are provided between an X-ray source and X-ray detector means and on which the workpiece to be tested, once placed in a suitable manner (and in a rotatable manner in order to produce a plurality of X-ray images, such as in the case of a tomography device), can be radiographed by X-rays emitted by the X-ray source. Electronic evaluation means disposed downstream of the X-ray detector means then allow the produced X-ray image to be analyzed, typically by way of electronic image evaluation, so that suitable measures can be initiated according to the intended purpose of operation.

It is considered generally known from the state of the art for the X-ray radiation usually exiting the X-ray source in a conically widened or spread manner to be projected onto the X-ray detector means in such a manner that their image detection elements, which are typically disposed like a matrix in a plane, are provided with the X-ray image of the radiographed workpiece in the best possible manner so that a best possible image resolution can thus be realized (as a function of an effective dimension, i.e., a maximum extension of the workpiece, for example).

For the purpose of the best possible image resolution, it is common and likewise considered known for an X-ray source minimized in terms of the X-ray focal spot (i.e., with a view to an effective X-ray exit area of the X-ray source) to be employed since an X-ray source having a smallest possible (ideally point-shaped) focal spot produces the best possible resolution with the least amount of blurring on an incidence surface of the X-ray detector means in the case of the outlined fanned-out (magnifying) X-ray radiation projection through the workpiece to be measured.

However, this approach is disadvantageous in that an X-ray focal spot minimized by the image sharpness requirements can only be achieved by comparatively complex (and therefore expensive) X-ray sources such as those known in the form of what is referred to as open microfocus X-ray sources; they are prone to failure and maintenance-intensive. A radiated power of such X-ray sources is additionally in need of optimization because of the X-ray focal spot limitations (hereinafter, the terms X-ray spot and X-ray focal spot are used synonymously), which, in turn, has disadvantageous effects on radiography and light exposure times, sensitivity requirements regarding the X-ray detector means, and the like against the background of generic industrial measuring technology since here—unlike in the medical field, for example, where the radiated X-ray power used is limited by biology—higher radiated power can lead to shorter light exposure times and therefore to increased process speed.

The technology to be considered known in principle from the state of the art implies that the X-ray source and/or the X-ray detector means can be displaced relative to each other and relative to the workpiece support along a direction of propagation of the X-ray radiation since this allows the known conical radiation emanating from the source to be adapted to different dimensions of a workpiece to be measured in the best possible way and with maximum exploitation of the X-ray detector means.

However, the technology referenced as the generic basis is still in need of optimization as a matter of principle and is in particular not readily and flexibly suitable in an ideal manner for a plurality of different workpieces and their respective different workpiece dimensions. For instance, (relatively) small workpieces in the radiation path do lead to a best possible exploitation of said detector when projected onto a maximum incidence surface of the X-ray detector means, but there is still blurring due to the long distance between the workpiece and the X-ray detector (and accompanying geometrical error effects). On the other hand, a (relatively) large workpiece, which will be closer to the X-ray detector when projected, does reduce these blurring issues, but the X-ray radiation of the (ideally point-shaped) source incident on the workpiece is of low power and a resulting geometry of the ratio of the (large) workpiece relative to the X-ray detector means leads to an image resolution of image pixels which is potentially higher than needed, i.e., requires unnecessary computing time; for instance, when additively manufactured workpieces are to be measured, it is sufficient for an evaluated resolution of the X-ray detector means to only be as great as the dimensions that a workpiece defect to be detected can even reach.

Additionally disadvantageously, the long radiation paths required in known magnification technology, for example, lead to large system or installation dimensions, which also leads to an immense system weight (often between 5000 and 10,000 kg) considering the required radiation protection. Systems of this kind usually need to be installed at ground level; this often involves conditions regarding installation and operation that are difficult fulfill and furthermore an unfavorable ratio of component (or workpiece) size to system/installation size and high follow-up costs for an operator. Methodically, the spatial resolution of such systems changes linearly with the size of the measured object or workpiece. Thus, high resolutions can only be achieved for small components and high magnifications. However, numerous new applications, such as for safety-related additively manufactured components, require high spatial resolution for larger components as well. In the described state of the art, such requirements cannot be fulfilled satisfactorily.

Figure 7A:
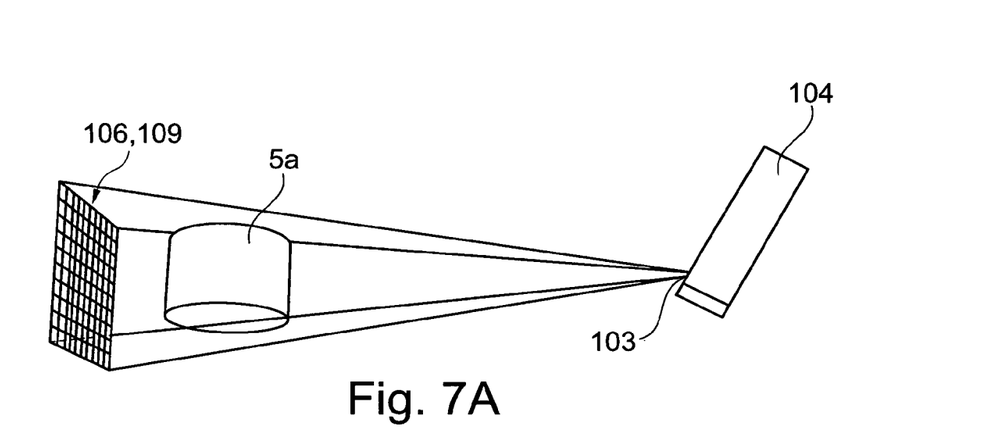
FIG. 7 illustrates basic approaches and accompanying disadvantages from the generic state of the art in the form of sub-images according to FIGS. 7A/B.
Figure 7B:
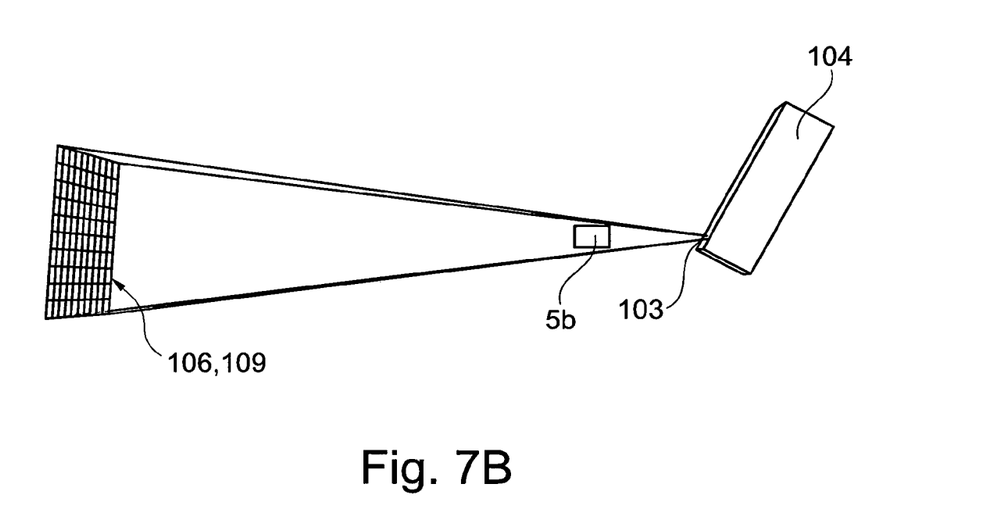

An assembly of this kind is schematically shown in FIG. 7 with two alternative sub-illustrations 7A, 7B for the state of the art. An X-ray source provided with reference sign 104 and having a small (ideally point-shaped) X-ray focal spot 103 generates a conical or fan-shaped (widened) X-ray path which radiographs workpiece 5*a*, 5*b* and reaches X-ray detector means 106, which have generic scintillator means which are only schematically shown and downstream of which optical detector means 109 are disposed. FIG. 7 does not show workpiece support means (usually realized as a turntable device) which can drive the schematic workpiece (shown in two variations in the sub-images of FIG. 7: large workpiece 5*a* at the top, small workpiece 5*b* at the bottom)

to rotate in the otherwise known manner to produce multiple tomographic images. Optical detector means 109, which form a component of X-ray detector means 106, are realized in the manner of a matrix as a (otherwise known) CMOS image sensor element whose physical pixel density is determined by the number of imaging pixels per unit area. Additionally, the optical image detector means of the configuration example of FIG. 7 are typically read out pixel by pixel, resulting in an electronic signal containing the image data at an effective pixel density, which is equal to the physical pixel density in this case.

FIG. 7 clearly shows that in order to always achieve the greatest possible coverage of X-ray detector means 106 by a respective X-ray fan generated by the X-ray source 104, workpieces 5a, 5b need to have different distances relative to the X-ray detector means (more precisely, its entry surface for the X-ray radiation and therefore the entry surface of the scintillator means provided there) as a function of a respective size of said workpieces (their respective specific dimension). In other words, as a function of the respective specific dimension of the workpiece to be measured, a magnification (by X-raying) of the workpiece as a projection onto the X-ray detector means achieved by the radiography varies significantly—workpiece 5a in upper sub-image FIG. 7A is magnified less than workpiece 5b in the lower sub-image FIG. 7B.

The consequence is that it is significantly more difficult to avoid blurring in the projection onto the X-ray detector means in the case of the lower sub-image than in the upper sub-image, which is accompanied by a longer light exposure time. At the same time, physically placing the (smaller) workpiece according to the lower sub-image closer to the X-ray detector means (relative to a large distance according to the upper sub-image), for example, is not an option from the expert's perspective since this would significantly reduce the achievable resolution and therefore the physical and effective pixel density in relation to the specific dimension of the workpiece and also deteriorate the image quality.

It is additionally necessary to keep focal spot 103 as small as possible in order to avoid the discussed (disadvantageous) blur effects, which in turn has the disadvantageous consequence that typical open microfocus X-ray sources have to be employed; however, they are both expensive and high-maintenance by comparison. An additional disadvantage is a lower radiated power (due to said small X-ray focal spot), which in turn is not ideal with a view to (desired) short light exposure times or similar operating parameters, especially in the case of a tomographic implementation of the invention involving a plurality of individual x-ray images to be produced (e.g., if the workpiece is turned).

SUMMARY OF THE INVENTION

Hence, the object of the present invention is to improve an industrial X-ray workpiece measuring system with regard to its suitability for a plurality of differently dimensioned non-medical workpieces while in particular also improving the generic system with a view to easy configuration, retrofitting and adaptability for different workpieces while additionally improving an X-ray image and evaluation quality of the electronic evaluation (and in particular also increasing an image sharpness of the X-ray image), wherein X-ray radiography and X-ray image capture times for a respective workpiece to be measured are to be reduced and thereby optimized. Additionally, the generic system is to be improved in terms of system size and system weight, and a practicable ratio of workpiece size to spatial resolution is to be improved.

The object is attained by the industrial X-ray workpiece measuring system, in particular the industrial X-ray tomography system, having the features disclosed herein; advantageous embodiments of the invention are also described herein and in the dependent claims. Additional protection within the scope of the invention is claimed for a method for industrial X-ray workpiece measuring which is particularly preferably provided and suitable for operating the industrial X-ray workpiece measuring systems according to the invention.

In an advantageous manner according to the invention, the invention initially moves away from the X-ray projection technology outlined above in connection with the state of the art, according to which X-ray radiation from an X-ray source which has a small focal spot and which is sent through the workpiece in a fanned out and thereby magnifying manner is projected onto the X-ray detector means in as large a size as possible (and wherein workpieces of different sizes are measured at different magnification rates). The present invention takes a different approach, namely the realization that it is advantageous for measured workpieces of different specific dimensions to be disposed close to an entry surface of the X-ray detector means. It is knowingly accepted that when the specific dimension of the workpiece to be measured is small (relative to the X-ray detector means), the radiographic image of the incident X-rays will be effectively radiated onto part of the surface of the X-ray detector means only. However, the present invention understands that the magnification of each of the workpieces is not as great as possible but (as) low (as possible) for such a (partial or full-surface) radiation situation and smaller workpieces are measured with a lower or the same magnification. The adaption to different workpiece sizes and resolution requirements is achieved (e.g., in steps) by a suitable configuration—or possibly an interchange or change—of the X-ray detector means, i.e., the optical detector means, with the (effective) pixel density suitable in each case.

In other words, the present invention makes it possible for the first time to set and provide a (optimized or best possible) pixel density necessary for a relevant workpiece dimension in an optimized manner, which allows the measurement to take place at the (effective) pixel density that is favorable and suitable for the respective measurement purpose, i.e., for internally detecting common defective dimensions, for example. Neither does the resolution—disadvantageously—decrease because of the lower magnification in the case of larger component, nor is the implemented device disadvantageously large and heavy as a result of the lower magnification and its shorter ray paths. Furthermore, in the case of smaller component sizes, the smaller opening angle (which is smaller as a matter of principle) of the cone surrounding the workpiece in the X-ray path leads to less artifacts during tomographic reconstruction (Feldkamp artifacts) and to reduced blurring in the scintillator means since the X-rays come in at a steeper angle.

Within the scope of the invention, the term "effective pixel density" is not necessarily understood to mean the same as physical pixel density. While the physical pixel density of a two-dimensional image sensor, such as an otherwise known CMOS image sensor (which is then in turn evaluated in the otherwise known manner by image evaluation technology), corresponds to an effective pixel density when the X-ray image is electronically evaluated pixel by pixel. Nevertheless, the term "effective pixel density" also describes the possibility that the physical pixels are evaluated in groups (i.e., two-fold in the dimensions on the sensor incidence surface, for example, so a combination of four pixels in the example); in this case, the effective pixel density would only be a fourth of the physical pixel density. Advantageously embodied pixel densities of the invention are more than 10/mm, preferably more than 50/mm, further preferably more than 100/mm (if pixels are assumed to be square; alternatively, these densities also apply to a width and/or height dimension of non-square pixels).

Moreover, it has been found within the scope of the invention that the described optimization according to the solution can also be realized if a ratio of the light exit surface of the scintillator means relative to the sensor incidence surface of the optical detector means is changed (usually by creating a physical distance); for example, by means of advantageous camera means (to be described in detail below) or similar projecting or light-guiding technologies.

According to the invention, this measure is advantageously combined with the teaching according to the invention that the effective X-ray focal spot of the X-ray source is to be provided, configured and dimensioned in such a manner that it is adapted to the effective pixel density in the claimed manner. After all, it has proven advantageous in the scope of the invention that when an area of the X-ray spot is equal to or greater than a pixel surface size (which as such describes the pixel surface resulting from the effective pixel density), favorable sharpness properties of the X-ray image that are suitable for the industrial measurement purposes can be achieved without requiring focal spot minimization of the X-ray source, for example (which is potentially disadvantageous for the reasons described above). Accordingly, expensive and high-maintenance hardware requirements can be avoided, and a focal spot optimized according to the invention (more precisely, an optimized area of the X-ray focal spot) realizes a potentially higher X-ray radiated power and therefore advantages with respect to light exposure times, detector sensitivity and the like.

Thus, in a surprisingly simple and elegant fashion and without applying measuring principles from the state of the art, the present invention enables highly effective measuring of workpieces having different dimensions, said measuring combining simplicity in terms of setting and operation with optimization of image quality and light exposure time while reducing production and maintenance costs.

According to the invention, a first scintillator module realizing the scintillator means according to the invention is additionally configured to be interchangeable with a second scintillator module, which differs from the first scintillator module in terms of its conversion properties of the X-rays. This is because it has proven advantageous in the scope of the realization of the system according to the invention that the scintillator means themselves offer significant optimization potential in the context of the object and the solution described above. For instance, there is a need for optimization with regard to a thickness of scintillator means (or of said scintillator modules); namely, a (relatively) thick scintillator module presents high efficiency in converting the incident X-ray radiation into photons of visible light (which are to be detected subsequently); on the other hand, said thickness leads to additional blurring. Within the scope of the invention, however, said blur property is evened out by the pixels of the effective pixel density used for evaluation insofar as blurring is tolerable and therefore acceptable on the scale of the effective pixel density since the resolution is not increased (and a higher resolution is not required according to the invention anyway). Thus, the present invention allows the efficiency of the X-ray conversion to be advantageously optimized by varying, i.e., interchanging, the scintillator modules, which is again accompanied by the advantageous effects of shortened detection times and therefore accelerated measuring processes. Varying the scintillator material alternatively or additionally to the described thickness of the respective scintillator module promises additional optimization potential, wherein these measures are also considered blur properties according to the invention relevant to X-ray conversion like the thickness described above.

According to an embodiment, the constructive realization of this idea offers nearly infinite options of how to make the scintillator modules interchangeable depending on the respective conditions in terms of construction and installation space. Aside from the pragmatic option of simple manual access by an operator, in particular mechanized or automated handling means realizing shifting, rotating and pivoting processes for suitably fed or held scintillator modules are another possibility.

The present invention allows a first operating mode and a differing second operating mode of the industrial X-ray workpiece measuring system to be realized, each operating mode having a differently configured or set physical and effective pixel density and an assigned scintillator module. These operating modes can be set by simple retooling or reconfiguration of the system and can therefore preferably be adapted to workpieces having different dimensions. The specific dimension according to the invention can be detected along different axial directions, in particular in a plane parallel to the scintillator means, i.e., to the light exit surface, wherein in particular a different transverse dimension can be favorably assigned to said different operating states (especially since the vertical position of the supported workpiece can be changed at least partially in a vertical dimension orthogonal thereto, i.e., axially parallel to an advantageous and preferably height-adjustable turntable of the workpiece support means according to an embodiment, by means of said workpiece support means).

For instance, in a preferable configuration of the industrial X-ray workpiece measuring system, the present invention provides that a distance between an axis of rotation of the workpiece support means and the scintillator means (which consequently form a front surface on the entry side of the X-ray detector means according to the invention) is configured differently for the respective operating modes. This is based on the finding according to the invention that, in the case of workpieces having different sizes and each having to be measured in the different operating modes, the distance between the X-ray detector means and the workpiece support means is particularly suitably varied in order to produce a potentially short distance from said X-ray detector means in each case, wherein this can take place both by adjusting (displacing) the workpiece support means and by analogously changing the place of the X-ray detector means (or both).

Additionally or alternatively, such an advantageous distance measurement can be defined according to the invention by determining a relevant and desired short (shortest) distance between the workpiece (to be measured in each case) and the scintillator means (again forming the entry side of the X-ray detector means). This is done by placing an imaginary surrounding cylinder (having a cylinder thickness of zero) whose surface then forms said distance from the scintillator surfaces. One advantage is that said distance can be different (again for different workpieces); however, it can also be the same or nearly the same. It is additionally particularly advantageous to realize this positioning by setting the relative distance in such a manner that at least one of these surface distances (i.e., for at least one of the operating modes) forms a no-contact smallest distance from the scintillator means, i.e., prevents the blur effects described above in connection with the state of the art as far as possible.

According to an advantageous embodiment of the invention, these measures have the effect that an enlargement of the X-ray length realized according to the invention and defined as the ratio of the diameter of the imaginary cylinder surrounding the workpiece relative to the associated extension of the projected image at the X-ray detector means, more precisely, at a ray entry surface of the scintillator means, is less than 1.5, preferably less than 1.2. Precisely this target parameter (of the magnification factor, which is small compared to the state of the art) according to the invention again advantageously aids in attaining the object according to the invention.

When the invention is realized in practice with this preferable configuration, this has the advantageous result that a ratio of the described surface distance relative to a diameter of the cylinder describing the surface is less than 1, wherein, in further advantageous configurations, this measurement can be significantly less than 1, namely further preferably less than 0.3 or even less than 0.1. In this way, it can preferably be ensured that imaging specific to the respective component and optimized for the respective measuring situation can be obtained—in particular without taking the approach known from the state of the art and illustrated in FIG. 7, for example—which employs the involved components (the scintillator means and the optical detector means) available in the given situation in the best possible manner while avoiding disadvantageous blurring and similar effects.

Within the scope of the present invention, this is additionally furthered by the measure according to the invention of configuring the X-ray focal spot according to the invention, i.e., in such a manner that the area of said X-ray focal spot is greater than or equal to the surface size resulting from the inverse of the effective pixel density. The preferable configuration of this aspect of the invention additionally provides that the area of the X-ray spot is configured to be larger (compared to the state of the art) to the extent that the area is five times, further preferably even more than ten times, the pixel surface size; in the concrete realization within common dimensions of the industrial X-ray workpiece measuring system according to the invention, this ensures that the focal spot size is commonly and preferably >50 µm, further preferably >150 µm, and further preferably even >300 µm.

Such an embodiment in particular advantageously allows (again turning away from the system-related power limitation of the approach according to the state of the art according to FIG. 7) an X-ray power of the X-ray source according to the invention to be provided that is preferably greater than 50 W, further preferably greater than 200 W and further preferably greater than 500 W; alternatively or additionally, the energy of the X-ray source would have to be configured in such a manner that it is greater than 200 keV, further preferably greater than 230 keV. It is generally favorable (in addition or alternatively to the variations mentioned above) for the X-ray source to be configured in such a manner that it has the shape of a closed tube.

Thus, the present invention advantageously allows the size of the focal spot of the X-ray source to be configured or selected in such a manner that a resulting blurring is connected to or is to be matched with corresponding scintillator means blurring due to scintillator properties and also with the (effective) pixel density of the optical detector means.

Another preferable embodiment of the invention provides that the light exit surface of the scintillator means is disposed at a distance from the sensor incidence surface of the optical detector means. While a realization of the invention can absolutely also provide a stacking or an immediate joining of the scintillator means and the optical detector means as described above, it has proven a particularly preferable, flexible and variable embodiment of the invention for the distance provided according to the embodiment to create space for light transmission means to be interposed, which can then flexibly put the detected dimensions or the dimensions to be detected in correlation with each other through the thus enabled projections.

For instance, it is initially preferred and advantageous for the interposed light transmission means to be configured as scaling image projection means which miniaturize the light rays (of a workpiece projected there) exiting the light exit surface of the scintillator means and transmit them to a sensor incidence surface (realized by a camera, for example). The image projection means according to the embodiment can be lenses or similar means realizing scaling (such as what is known as fiber-optic tapers) for influencing the guided visible light and can particularly preferably exploit the advantages of (industrial) camera technology.

This applies in particular if the camera means are modular and can be suitably arranged and interchanged, wherein the additional advantage is created that the optical detector means according to the invention do not merely have to be a single such (digital) camera but that a plurality of cameras can be provided according to a given detection purpose. This variation of the solution allows different partial surfaces of the (scintillator) light exit surface to be assigned to respective cameras, and these cameras can additionally or alternatively present different (physical or effective) pixel densities, the options for optimized detection thus being nearly unlimited. In particular, adaptions (e.g., to changed dimensions or extensions of the workpiece, additionally or alternatively changed measurement requirements for defect tolerances to be detected) can be realized very simply and often even by untrained operating personnel since pre-configured camera modules simply have to be suitably positioned or interchanged, if applicable, in such a case.

A variation or an alternative for realizing the scaling image projection means provided according to an embodiment of the invention consists in the use of what is known as fiber-optic cones (often also referred to as fiber-optic tapers). These types of assemblies of individual fibers which are often provided as bundles, each fiber effecting scaling (typically miniaturization, but magnification is also possible), allow the projection means to be optimized in particular for a fixed scaling ratio, permit highest degrees of efficiency and are particularly mechanically stable and resistant to failure in the realization of this extended functionality according to the embodiment.

An additional embodiment of the invention, which improves the flexibility and the variability of the system according to the invention, provides that the scintillator means and the optical detector means are already configured in a jointly modular, mutually optimized fashion within the scope of the invention in such a manner that such a combined module is suitably changeable, further preferably automatically changeable. In turn, it is favorable for such a solution, which is optimized in terms of comfort, to provide suitably pre-configured digital cameras for realizing the optical detector means.

Within the scope of the realization of the present invention, it is possible to provide the workpiece support means in a stationary manner and invariably in terms of the position relative to the X-ray source and/or the X-ray detector means; however, it is preferable to also provide such an axial displaceability. This is based on the idea that, as a function of respective dimension and material properties of a workpiece to be measured, it can be thoroughly advantageous in particular to be able to predetermine and set a relevant distance from an entry surface of the scintillator means, in particular also for realizing a smallest possible magnification. Alternatively, the distance from the entry surface of the scintillator means to the workpiece can be changed or set by displacing the scintillator means; again additionally or alternatively, the X-ray source can be configured to be displaceable along the axis.

While the present invention initially acts as a system realizing the advantages described above, the invention nevertheless comprises an operating method which particularly preferably describes the operation of the system according to the invention but can in principle also provide an advantageous approach to industrial X-ray measuring of workpieces therebeyond and independent thereof.

For instance, it is particularly preferable and advantageous to adhere to the following order or sequence of steps when operating the system according to the invention or when implementing the system:

Once the workpiece to be measured has been placed on the workpiece support means (and a position of the workpiece support means has been adjusted relative to the X-ray detector means as a function of a dimension of the workpiece according to an advantageous embodiment, if applicable), the optical detector means (and additionally or alternatively the light transmission means, if applicable) are selected and configured as a function of the specific dimension of the workpiece to be examined and as a function of the area of the X-ray spot. This is done, for example, by determining at which effective pixel density the workpiece is to be measured with a view to a desired resolution while avoiding an unnecessarily fine resolution not needed for the respective required purpose. According to the present invention, this is done by first suitably setting, configuring, interchanging, and preparing (e.g., by bundling physical pixels) the optical detector means for evaluation according to the desired effective pixel density.

Then, the scintillator means according to the invention are suitably selected or configured, in particular as a function of the optical detector means, i.e., the configured effective pixel density. As described above, the scintillator means can also be optimized by suitable selection of a thickness and/or a scintillator material of the scintillator means, for example, whereby the desired blur property is adapted to the effective pixel density evaluated by the optical detector means, which has a corresponding effect on the measuring and light exposure time needed for determining the light signal.

These setting/configuration steps are followed by the radiographing of the workpiece according to the invention after activation of the X-ray source, the image pixels of the optical detector means with the effective pixel density permitting optimized detection and evaluation of the X-ray image. In the case of tomographic measuring, a given number of individual images is captured in a common manner (the number being varied by turning the workpiece support means, for example) and the X-ray images are computed accordingly in a three-dimensional (and otherwise known) manner to obtain the desired three-dimensional image.

Additional protection within the scope of the invention is claimed for a method for operating the industrial X-ray workpiece measuring system, which is preferably realized as an industrial X-ray tomography system, the method comprising the steps indicated in the independent method claim. These steps are also modified further by the dependent method claims, wherein all method steps apparent from the present system invention description are also deemed to be disclosed as belonging to the method invention (also regarding the first and second operating modes) within the scope of the present disclosure and as such advantageously modify the method according to the invention.

BRIEF DESCRIPTION OF THE DRAWINGS

Other advantages, features and details of the invention are apparent from the following description of preferred embodiment examples and from the drawings.

DETAILED DESCRIPTION

Figure 1:
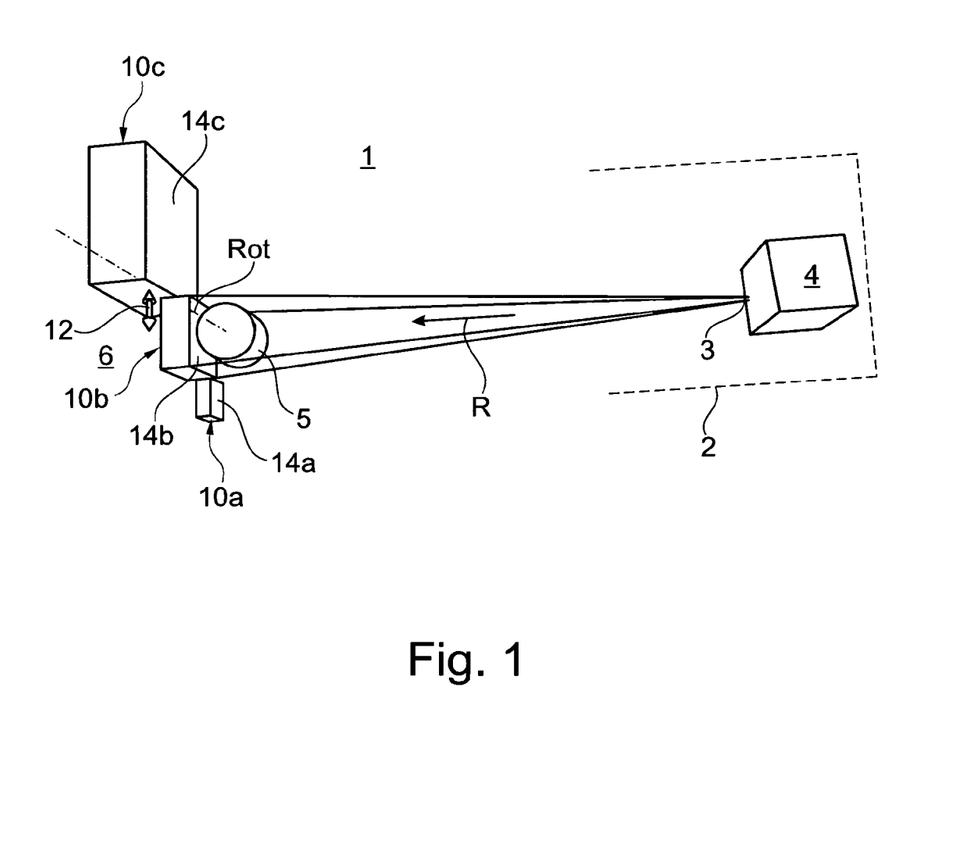
FIG. 1 is a perspective view of the industrial X-ray workpiece measuring system as an industrial X-ray tomography system according to a first preferred embodiment example of the invention.

FIG. 1 shows a schematic perspective view of a preferred embodiment of the X-ray workpiece measuring system 1 according to the invention as an industrial X-ray tomography system. An X-ray source 4 having an X-ray focal spot 3 of a typical focal spot size of 200 µm and an X-ray power of approx. 300 W limits an X-ray path in an (schematically and partially illustrated) X-ray protection housing 2 at one end. It is shown how the emitted X-rays move along an X-ray propagation direction R and—widened in the shape of a cone or fan—hit X-ray detector means 6 provided at the other end on the other side of housing 2. A workpiece 5, which is schematically illustrated by an imaginary cylinder surrounding and being in contact with workpiece 5 and as such describing a circumferential surface, is introduced into said ray path. The workpiece is additionally accommodated or held on workpiece support means (not shown in the FIGURE), which are configured as a typical turntable assembly (which is additionally height adjustable in this case). The marking Rot describes the (schematically shown) axis of rotation of the turntable, wherein it is assumed for the sake of simplification that workpiece 5 rests thereon coaxially with the circumferential cylinder in the embodiment example shown.

FIG. 1 further shows how the X-ray detector means according to the invention are realized in the form of three modules (each configured to be displaceable in the ray path), namely in the form of a smallest first module 10*a* (which is still located outside of the ray path), a second module 10*b*, which is located in the ray path and configured to measure workpiece 5, and a third module 10*c*, which is again located outside of the ray path. In this regard, schematically shown double arrow 12 in FIG. 1 signifies the option of suitably moving respective modules 10*a* to 10*c* into the ray path by shifting or similar interchanging movements to realize the first and second (and other) operating modes according to the invention.

A respective module-specific (and therefore operating mode-specific) assignment of the functional components within modules 10*a* to 10*c* for realizing the functionality as an X-ray detector means according to the invention is not shown in detail in FIG. 1. A scintillator assembly is provided in each of the modules at the entry side and as such for realizing X-ray entry surfaces 14*a*, 14*b* and 14*c*, respectively, the scintillator assembly converting the incident X-rays of source 4 into visible light in the otherwise known manner. This is done by optical detector means disposed (immediately) downstream of (and being in contact with) the scintillator means, said optical detector means, which form a matrix and are formed by an arrangement of common CMOS image detection pixels, then converting the converted X-ray image (not visible in FIG. 1) into common electronic signals at the (scintillator) light exit surface as it enters the immediately following (optical) sensor incidence surface.

When the operating mode is changed (i.e., the X-ray detector means 10*a*, 10*b*, 10*c* are changed), the pixel density and the scintillator blur property are changed and the distance between the scintillator and the component or, more precisely, the axis of rotation is adapted (optimized) by transverse shifting according to double arrow 12.

According to the invention, the embodiment example of FIG. 1 thus advantageously allows each of the modules to be assigned a configuration of the scintillator means, of the optical detector means disposed downstream thereof, and of the specific distance of the workpiece from the scintillator individually adapted in particular to the given workpiece dimension (specific dimension) to be measured, which is embodied by the visible cylinder diameter, for example; the change from the first operating mode to the second operating mode (and to other operating modes, if applicable) according to the invention takes place according to a movement 12, for example, by shifting respective (suitably preconfigured) modules 10*a* to 10*c*, and an optimized (shorter) distance can be set for each of the workpieces.

Figure 2A:
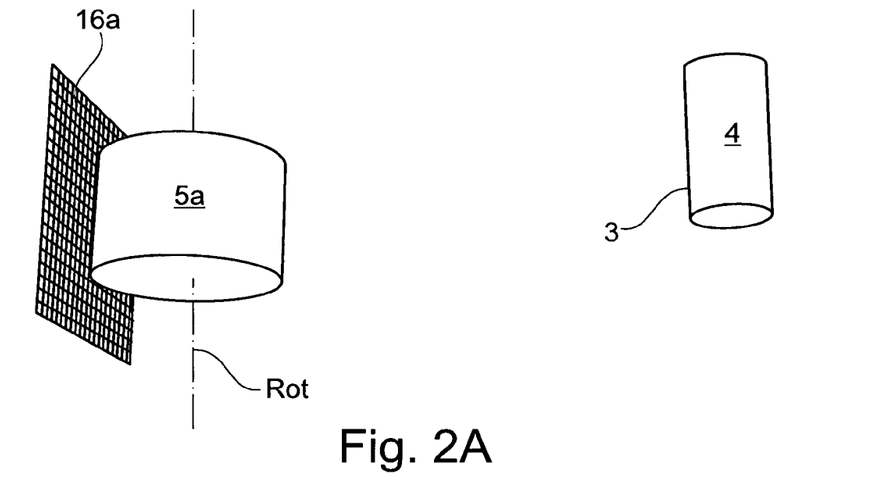
FIG. 2 is a diagram illustrating the principle of a preferred measuring method or a measuring principle for the embodiment example of FIG. 1 with a workpiece to be measured moved close to the scintillator means in each case.
Figure 2B:
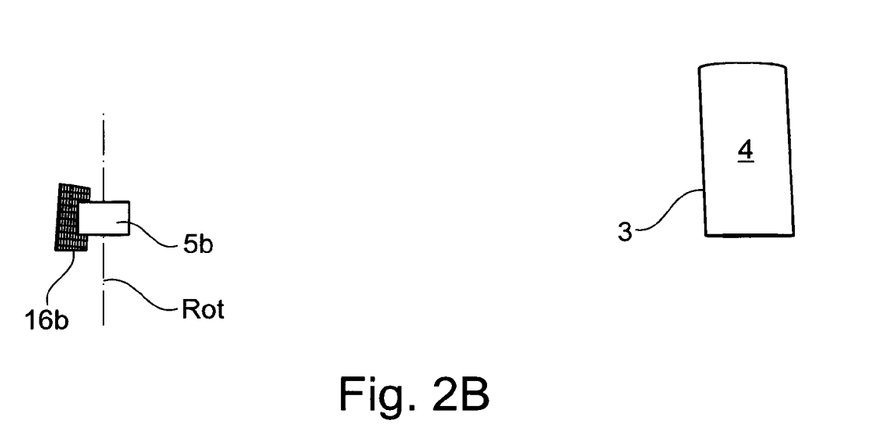

FIG. 2 including sub-illustrations (a) and (b) clarifies the advantageous effect of the approach according to the embodiment example of FIG. 1, for example. The sub-illustrations merely show respective workpieces 5 and 5*b*, which have different sizes and to which the sensor incidence surface of the optical image sensor (contained in modules 10*a* to 10*c*) is assigned; the interposed scintillator means are not shown for the sake of simplification of the illustration. The direct comparison of sub-image (a) with sub-image (b) in FIG. 2 shows that the physical pixel density of light exit surface 16 (16*a* for sub-figure a and 16*b* for sub-figure b) varies depending on a specific dimension (both the cylinder width and a cylinder height along axis of rotation Rot in the case at hand); additionally, the actual surface varies in size. In connection with a scintillator means (not shown) adapted, in each case, to the resolution conditions of the associated optical sensor means achieved thereby, it becomes clear that a measurement optimally adapted to the workpiece can take place in which all negative effects described above are minimized. Furthermore, it becomes clear that, unlike in the state of the art described above in connection with FIG. 7, for example, a distance between the X-ray detector means (modules 10*a* to 10*c* in FIG. 1 and surfaces 16*a* and 16*b* in said modules in FIG. 2) does change relative to the workpiece, but that they also allow the distance to be optimized. For instance, the distance of axis of rotation Rot in sub-figure (b) of FIG. 2, where the workpiece is smaller, is clearly smaller than the relative distance in sub-figure (a), which is the opposite of the fanned-out projection principle of FIG. 7. However, the principle shown in FIG. 2 in particular enables the optimized best possible image quality for a respective workpiece dimension.

Obviously, the displaceability (schematically illustrated by arrow 12) of the individual modules can in any manner provide a workpiece dimension-dependent assignment (of the respective module for a respective operating mode) to a given workpiece to be measured; this can take place both manually and automatically or semi-automatically by interchange.

The comparison of sub-figures (a) and (b) in FIG. 2 also illustrates how the respective operating modes have different physical pixel densities (represented by the matrix-type structure of the sensor incidence surfaces 16*a* with a pixel width of 100 μm (i.e., 10 pixels/mm), for example, for an assumed cylinder diameter of 300 mm of workpiece 5*a* and with a pixel width of 10 μm (i.e., 100 pixels/mm) of sensor 16*b*, for example, for the cylinder diameter of 30 mm of workpiece 5*b*). Assuming that said image pixels in this physical form are typically detected and processed individually, the resulting effective pixel density would be equal to said physical pixel density (so greater in sub-figure (b) than in sub-figure (a)). In the event that the resolution is varied (by what is known as binning) because of bundling or grouped electronic detection of the visible image pixels, a consequently higher effective pixel density relative to the physical pixel density would arise in the electronic image signal resulting from the reading out of the CMOS sensors.

Figure 3:
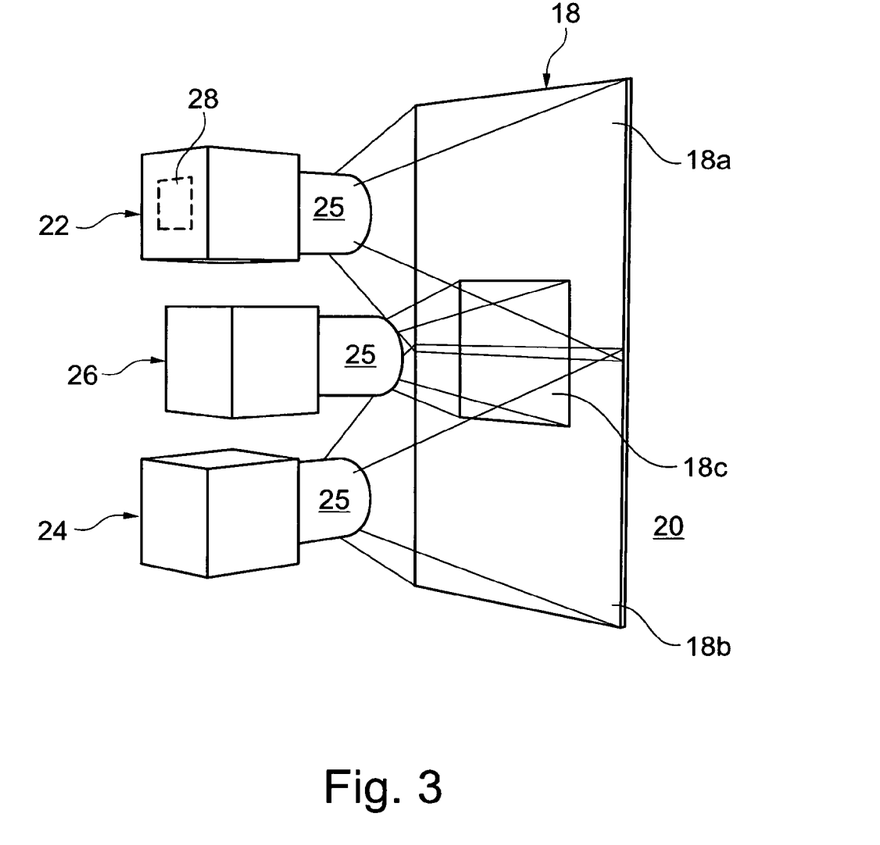
FIG. 3 is a perspective view of the industrial X-ray tomography system according to a second embodiment example of the invention.

The second embodiment example of FIG. 3 shows an alternative approach in particular for realizing the X-ray detector means according to the invention, wherein this illustration of the principle in turn enables various variations and operating modes itself. A light exit surface at a rear end (relative to the X-ray source not shown) of scintillator means 20 shown as rectangular and disk-shaped is shown first of all in the form of reference sign 18. For realizing said detector means disposed optically downstream within the scope of the invention, three digital camera assemblies 22, 24, 26 are provided which are directed at light exit surface 18 and positioned in such a manner that the two outer digital camera assemblies 22 and 24 capture an upper partial surface 18*a* and a lower partial surface 18*b*, respectively, of the light exit surface. More precisely, each of said digital camera assemblies 22 and 24 is configured and disposed in such a manner that schematically shown lens modules 25 of the camera modules project respective partial surfaces 18*a* and 18*b* onto internal image detectors 28 (shown exemplarily for camera module 22 only). The detector resolution of said module 28 in turn determines the physical pixel density and therefore the image resolution of the camera means and also forms the respective sensor incidence surface.

Additionally, FIG. 3 shows how center camera module 26 in the assembly of the camera modules is directed at an inner partial surface 18c of light exit surface 18 of the scintillator means, inner partial surface 18c having a surface size that is lower than that of partial surfaces 18a and 18b but centrically disposed.

The assembly configured as shown in FIG. 3 can now be operated in connection with possible realizations of the invention in such a manner that in the first operating mode, for example, outer camera modules 22 and 24 cover their respective partial surfaces 18a and 18b (and therefore for detecting entire surface 18) and accordingly convert images of optical light produced there by the scintillator means (in response to X-rays (not shown) radiating into the scintillator means) into accordingly evaluable digital images. The first operating mode would typically be used for a workpiece (not shown) that, when suitably placed in front of the scintillator means, leads to an X-ray radiation coverage across both partial surfaces. In contrast, camera module 26 could be operated (in an isolated manner) in order to measure a relatively smaller workpiece, which is suitably projected onto partial area 18c; alternatively, camera module 26 can also be used for measuring only a portion of a (relatively large) workpiece relating to partial surface 18c. Also, the preferable configuration of the invention provides that partial surface 18c of scintillator 20 has a scintillator property adapted to said operating mode (i.e., is thinner than the surrounding scintillator, for example); alternatively, the embodiment example shown in FIG. 3 provides the option of interchanging the overall scintillator assembly—entirely or partially—against another scintillator having an accordingly different X-ray blur property.

Also, the realization of embodiment examples of FIG. 3 does not require all camera modules to have optical detector means 28 with the same physical pixel density; the latter, too, is variable either by suitable (pre-)configuration of respective camera modules 22 to 26 to be used or again by the grouped reading out of sensors of high pixel density as described above with the purpose of realizing an accordingly lower effective pixel density—again as a function of the assigned scintillator means for a respective operating mode in each case.

Figure 4:
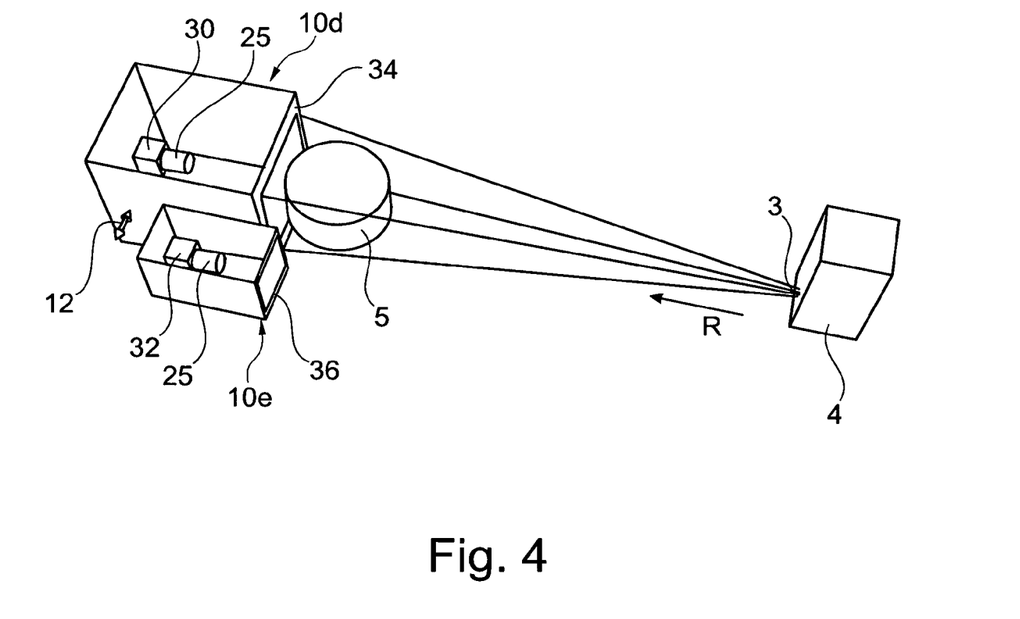
FIG. 4 is a perspective view of the industrial X-ray tomography system according to a third embodiment example of the invention.

The embodiment example of FIG. 4 (again allowing a number of variations) takes up basic ideas of the first and second embodiment examples and shows in particular an option of how the modules illustrated in FIG. 1 can be configured alternatively to a direct-contact layering of the scintillator matrix and the optical detector matrix (FIG. 1): camera modules 30 and 32 form the optical detector means within modular X-ray detector means 10d and 10e, respectively, (which are again interchangeable or movable along arrow direction 12). As can be seen, camera modules 30 and 32 are positioned differently according to the optical image magnification to be realized, i.e., according to the desired distance from scintillator means 34 and 36, respectively, which are formed at the front, i.e., at the entry side, of the modules. Said scintillator means 34 and 36, too, are adapted according to the respective physical and effective pixel densities and thus allow the best possible adaption according to the invention to the workpiece to be measured (more precisely, its specific dimension). As is also visible, depending on the positioning, both modules 10d and 10e can be disposed at different distances from an axis of rotation (not shown) of a workpiece support realized as a turntable.

Like in the embodiment examples described above, the focal spot is large in this case, in particular compared to the state of the art described in the introduction, and follows the exemplary dimensioning in the embodiment example of FIG. 1, for example.

Figure 5:
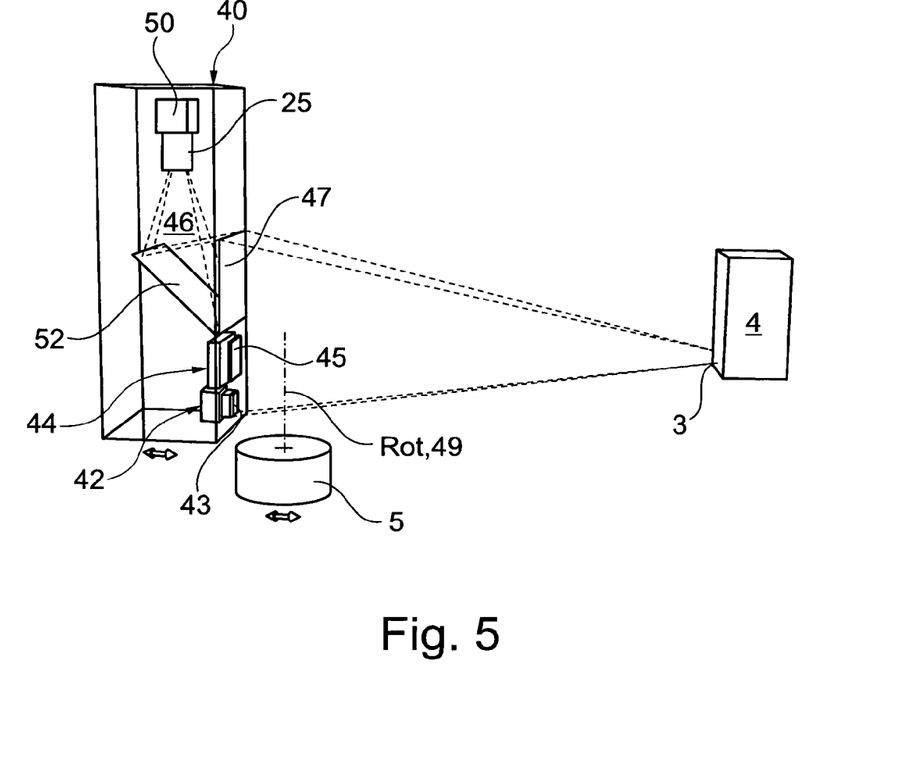
FIG. 5 is a perspective view of the industrial X-ray tomography system according to a fourth embodiment example of the invention.

The embodiment example of FIG. 5 shows other variations of the invention, which can in turn be realized both individually and in combination with any of the embodiment examples described above (if technically expedient).

An X-ray detector housing 40 is shown first of all, which can realize different X-ray detector variations—again assigned to different possible workpiece dimensions. These variations are selected or approached by workpiece support means (not shown) which can displace or shift workpiece 5 along an axis of rotation Rot of a turntable, namely from a lower first X-ray detector assembly 42 having an assigned scintillator entry surface 43 via a center (again along the axial direction) X-ray detector assembly 44 (having an entry surface 45) to an upper X-ray detector assembly 46 having an entry surface 47.

In particular X-ray detector assemblies 42 and 44 each have stacked scintillator means and optical detector means disposed (optically) downstream, wherein light transmission means are provided in both cases, however, namely in the form of fiber-optic plate or taper assemblies influencing the optical ray path, wherein assembly 44 exemplarily receives a fiber-optic plate and assembly 42 receives a taper. Both X-ray detector assemblies 42 and 44 are configured differently from each other with respect to different workpiece dimensions and thus realize the first and the second operating mode, respectively, in such a manner that the respective combination of the scintillator and the optical detector is optimized for the respective workpiece specific dimension (and the interposed optical transmission means ensure the transmission needed in each case). In contrast, the third X-ray detector provides deflection of the optical ray path between the scintillator means forming entry surface 47 and the optical detector means, which are realized as camera module 50 in this case, in the form of a suitable deflection mirror 52 in the ray path, which means that an entry surface is realized that is significantly enlarged compared to units 42 and 44 (i.e., to surfaces 43 and 45 assigned there) and accordingly permits measuring of a larger workpiece, and that the deflection means that no rear-side dimension increase is required in housing 40; instead the entire assembly can still be optimized in a compact and space-saving manner (and also in a weight-saving manner with respect to the X-ray shielding conditions).

Here, too, the side of the X-ray source is configured to be large with a view to the dimensions of the focal spot and analogously to the approach in the first embodiment example, for example.

During operation, the shown embodiment example of FIG. 5 now allows an ideal measuring position relative to the respective X-ray detector unit to be selected according to a respective workpiece dimensioning by (vertically) displacing the workpiece to be measured along axis 45 and/or positioning the workpiece on the turntable. Since units 42 to 46 additionally establish different modes in relation to axis 45, as shown in FIG. 5, optimization is permitted in this way, as well.

Another advantage of the shown deflection of the optical radiation by mirror 52 is that the camera is provided outside of the X-ray cone (protected from X-ray radiation). The embodiment example further allows the distance of the axis of rotation from the respective scintillator to be adapted, i.e., optimized, according to the invention by displacing the detector unit or the turntable (double arrows in FIG. 5).

Figure 6A:
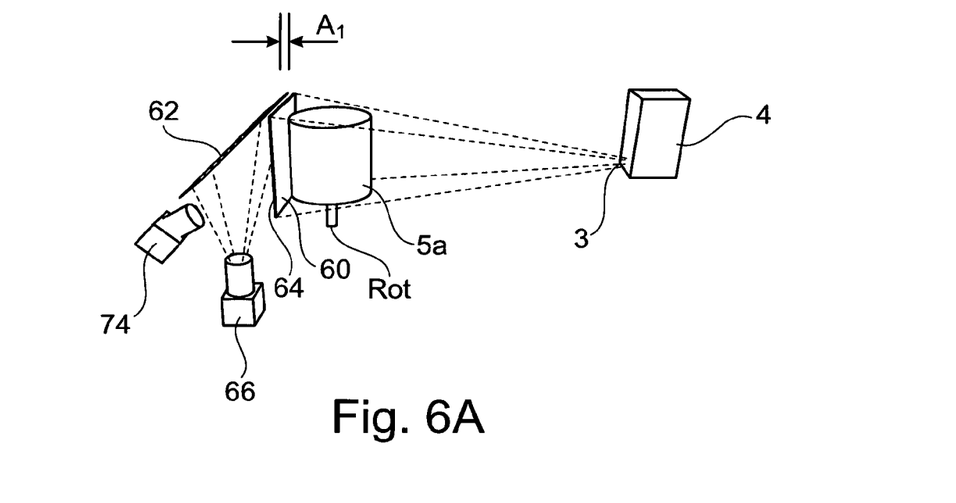
FIG. 6 shows two possible variations for further configuring a (possibly perspective-corrected) deflection technology in the optical ray path between the scintillator means and the optical image detection means in sub-illustrations of FIGS. 6A/B as further configurations or variations of the invention.
Figure 6B:
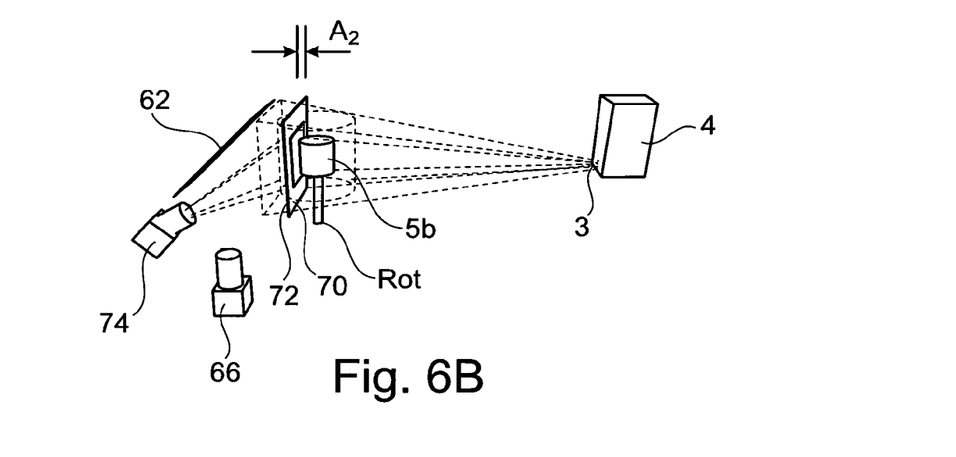

Other possible variations of the invention are shown in the embodiment examples shown in FIGS. 6A and 6B; they can also be combined with all of the embodiment examples described above.

For instance, FIG. 6 shows how the deflection principle illustrated based on X-ray detector unit 46 in FIG. 5 can be varied or substituted depending on the measurement requirements offered by a respective workpiece. For instance, the embodiment example of FIG. 6A shows how a relatively large workpiece 5a (an axis portion Rot of the workpiece support means is additionally shown) is positioned at a first optimized (minimized) distance $A_1$ in front of a scintillator entry surface 60. A deflecting mirror 62 would then project the optical image appearing on light exit surface 64 onto a first camera module 66, which is configured in such a manner in terms of a pixel density in particular regarding the optical detector (not shown in detail) contained therein that the nearly full-surface X-ray image on surface 6 can be captured and converted. On the other hand, in the case of a smaller workpiece 5b in sub-image B, the arrangement of FIG. 6 allows a partial surface 70 of adapted scintillator means interchanged compared to FIG. 6A to be reached by the X-ray path. The image produced therefrom by the (interchanged) scintillator on light exit surface 72 is captured by a second camera module 74, which then effects conversion into the electronic image signal without using the deflecting mirror 62, but still with optical angle alignment (exploiting what is known as the Scheimpflug principle). The optical detector means shown in camera module 74 are suitably set in terms of their physical and effective pixel density and in particular also optimized together with the scintillator (interchanged for this purpose) again according to what is required of the measurement of smaller workpiece 5b. FIG. 6B additionally shows how an optimized (minimized) distance $A_2$ is set according to smaller workpiece 5b compared to distance $A_1$ for workpiece 5a in 6A by suitably displacing axis of rotation Rot of the workpiece, for example, or additionally or alternatively by the configuration of the scintillator (which is interchanged anyway). Accordingly, the distance can also be adapted by changing the location of the scintillator (which is interchanged anyway) while the position of the axis of rotation stays the same. Another advantage of the deflection of the optical radiation by mirrors and the Scheimpflug principle is that the camera (s) are provided outside of the X-ray cone and protected from X-ray radiation.

The overall view shows in each case that better compactness of the overall assembly compared to purely linear assemblies can be achieved especially by the interaction of deflecting mirror 62 and perspective-correcting camera module 74.

All embodiment examples described above can each be modified or varied individually or in any combination of the variations shown therein by additional options not shown in the figures in order to adapt the optical detector means (with their optical and effective pixel density configured for a given measuring situation according to the first and second operating modes) to the properties of the respective assigned scintillator means within the scope of the invention. Additionally, the embodiment examples described above have shown how in particular the distances of the respective workpieces (and of the workpiece support means holding them) can be optimized with respect to the scintillator means (and the X-ray detector means) in such a manner that the achieved significant shortening of said distance can significantly improve the light exposure time, any issues due to the X-ray source (such as drift, thermal effects or instabilities), the achievable device or system dimensions and the acquisition and image quality without consideration of projection requirements like in the state of the art. After all, within the scope of the invention, this makes the image quality dependent on the situation (i.e., dependent on the first/second/other operating mode specifically set in each case) and no longer dependent on a positioning of a workpiece (having a given size) in the ray path with the measuring technology being invariable otherwise, as was still discussed in the state of the art analogously to FIG. 7. Thus, the desired and achieved resolution no longer scales with the workpiece size, large workpieces can be captured at high resolution, and devices are more compact with regard to required system measurements. In particular, the use of X-ray sources according to the invention, which have a larger focal spot (and a closed architecture), results in the additional advantage of lasting stability and low maintenance.

Therefore, it is expected that the present invention will allow the industrial X-ray workpiece measuring technology to advance to entirely new measuring dimensions and precisions and therefore in particular also to the requirements of highly complex measuring conditions, such as those presented by three-dimensional and layered fabrication technologies and in the context of industry 4.0 conditions. Nevertheless, the present invention is not limited to preferable uses of this kind but is suitable for any application purpose of industrial workpiece measurement where situation-specific precision is to be combined with best possible image quality.

The invention claimed is:

1. An industrial X-ray workpiece measuring system, comprising
   an X-ray source (4) disposed in an X-ray protection housing (2) and having an X-ray focal spot (3),
   workpiece support means for holding a non-medical workpiece (5) to be examined, the workpiece support means being disposed in the X-ray protection housing, and
   X-ray detector means (10a, 10b, 10c) provided on and/or in the X-ray protection housing and configured to detect an X-ray of the X-ray source radiographing a workpiece held on the workpiece support means,
   the X-ray detector means comprising a scintillator (20) for converting incident X-rays into visible light on a light exit surface (18) and optical detector means (28) disposed optically downstream thereof and comprising a plurality of image pixels in a physical pixel density disposed adjacent to each other at regular intervals and forming a common sensor incidence surface,
   the image pixels detecting the visible light produced by the scintillator for electronic evaluation at an effective pixel density,
   wherein
   the scintillator comprises at least one of a first scintillator and a second scintillator, wherein the first scintillator is configured to be interchangeable with the second scintillator, the second scintillator differing from the first scintillator in a blur property relevant to X-ray conversion,
   wherein the optical detector means are configured in such a manner that the physical and/or the effective pixel density can be changed in a predetermined manner, during configuration, set-up, interchange and/or evaluation of the optical detector means,
   and/or a ratio of the light exit surface relative to the sensor incidence surface does not equal 1 and/or can be changed during configuration, set-up, interchange and/or evaluation of the optical detector means, and wherein the X-ray focal spot effective for an X-ray output from the X-ray source is dimensioned and configured in such a manner that the area of the X-ray focal spot is greater than or equal to a pixel surface size resulting from the inverse of the effective pixel density, the industrial X-ray workpiece measuring system being configured in such a manner that it can be transferred from a first operating mode with a first physical and/or effective pixel density to a second operating mode with a second physical and/or effective pixel density, which differs from the first one, by configuration, set-up, interchange and/or evaluation of the optical detector means, and the first scintillator being assigned to the first operating mode and the second scintillator being assigned to the second operating mode.

2. The industrial X-ray workpiece measuring system according to claim 1, wherein the area of the X-ray focal spot (3) is more than five times, the pixel surface size, and/or a focal point size of the X-ray source is >50 μm.

3. The industrial X-ray workpiece measuring system according to claim 1, wherein a distance between an axis of rotation of the workpiece support means and the scintillator in the first operating mode is configured to be different from the distance in the second operating mode, and/or a surface distance (A1) between a surface of an imaginary cylinder surrounding and being in contact with the workpiece held on the workpiece support means and the scintillator in the first operating mode is different from a surface distance (A2) of the surrounding cylinder in the second operating mode, and/or at least one of said surface distances realizes a no-contact smallest distance from the scintillator.

4. The industrial X-ray workpiece measuring system according to claim 1, wherein the workpiece support means and/or the scintillator are realized and configured in such a manner that a surface distance between a surface of an imaginary cylinder surrounding and being in contact with a workpiece held on the workpiece support means and the scintillator presents a ratio of less than 1 relative to the diameter of the cylinder.

5. The industrial X-ray workpiece measuring system according to claim 1, wherein the first scintillator and the second scintillator are configured to be interchangeable by manual access of an operator and/or automatically by means of handling means by shifting, rotating and/or pivoting operation.

6. The industrial X-ray workpiece measuring system according to claim 1, wherein the light exit surface is spaced apart from the sensor incidence surface by an adjustable and/or settable length, with light transmission means (25; 52; 41) being interposed, and/or is different for the first and the second operating mode.

7. The industrial X-ray workpiece measuring system according to claim 6, wherein light beams of the visible light exiting the light exit surface can be projected onto the sensor incidence surface by light transmission means that are realized as image projection means effecting scaling and miniaturization, the ratio of the light exit surface relative to the sensor incidence surface further being between 1 and 10.

8. The industrial X-ray workpiece measuring system according to claim 6, wherein the light transmission means with the optical detector means being included, are realized as a camera module (22; 24; 26).

9. The industrial X-ray workpiece measuring system, according to claim 8, wherein a plurality of camera modules forming the image projection means and the optical detector means is configured and/or disposed in such a manner that at least one of the camera modules projects a first partial surface (18a) of the light exit surface onto the sensor incidence surface of the assigned camera module, and/or a second partial surface (18b, 18c) adjacent to or embedded in the first partial surface is captured by another one of the camera modules (26) in an adjacent or overlapping manner, and/or the optical detector means formed by the camera modules have different physical pixel densities.

10. The industrial X-ray workpiece measuring system according to claim 6, wherein the light transmission means are realized as an assembly of fiber-optic light guide elements.

11. The industrial X-ray workpiece measuring system according to claim 1, wherein the scintillator and the optical detector means are realized as an interchangeable unit in the manner of a module (10a, 10b, 10c).

12. The industrial X-ray workpiece measuring system according to claim 1, wherein the workpiece support means are configured to be adjustable and/or displaceable along an axis extending between the X-ray source and the scintillator.

13. A method for X-ray measuring of a workpiece, as a method for operating the system according to claim 1, comprising providing the workpiece to be measured on the workpiece support means;

selecting and/or configuring the optical detector means as a function of a specific dimension of the workpiece to be examined, wherein the specific dimension is a dimension of a portion of the workpiece relevant to the examination, and as a function of the area of the X-ray focal spot;

selecting and/or configuring the scintillator as a function of the effective pixel density offered for the electronic evaluation by the optical detector means; and radiographing the workpiece by activating the X-ray source and evaluating the image pixels of the optical detector means with the effective pixel density.

14. The method according to claim 13, wherein the workpiece to be measured is provided on the workpiece support means in such a manner that a surface distance between a surface of the imaginary cylinder surrounding and being in contact with the workpiece held on the workpiece support means and the scintillator realizes a no-contact minimum distance by adjusting or displacing the workpiece support means along an axis extending between the X-ray source and the scintillator.

15. The industrial X-ray workpiece measuring system of claim 1, wherein the workpiece support means is configured to perform a rotary motion.

16. The industrial X-ray workpiece measuring system of claim 1, further comprising defect evaluation of an X-ray image of the workpiece to be examined produced by the X-ray detector means.

17. The industrial X-ray workpiece measuring system according to claim 1, wherein the optical detector means are configured in such a manner that the physical and/or the effective pixel density can be changed as a function of a specific dimension of the workpiece to be examined.

18. The industrial X-ray workpiece measuring system according to claim 8, wherein the camera module is a digital camera having at least one lens (25).

19. The industrial X-ray workpiece measuring system according to claim 10, wherein the assembly of fiber-optic light guide elements effects miniaturization.

20. The industrial X-ray workpiece measuring system according to claim 11, wherein the interchangeable unit is an automatically changeable unit with at least one digital camera being included as an optical detector means.

* * * * *